Figure 1:
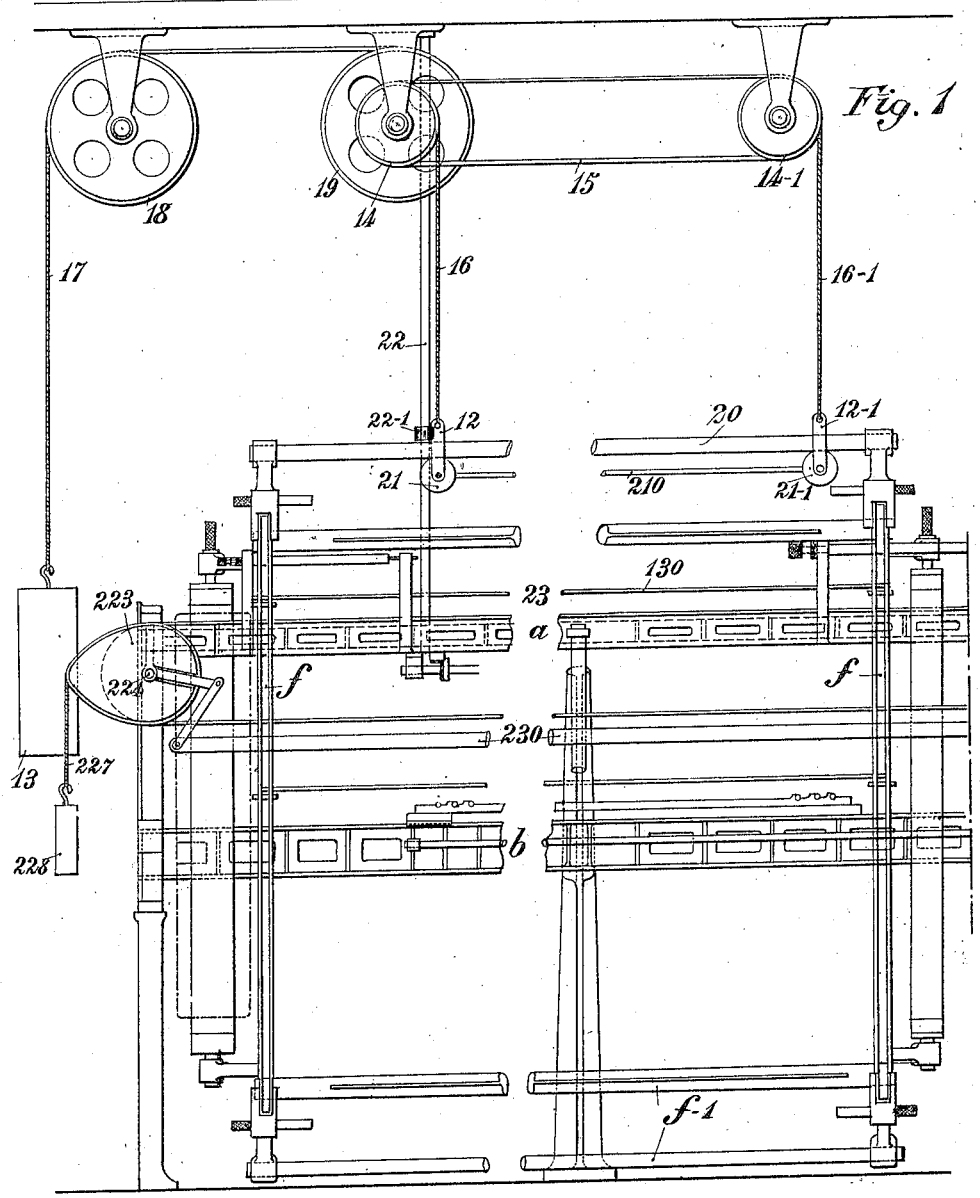

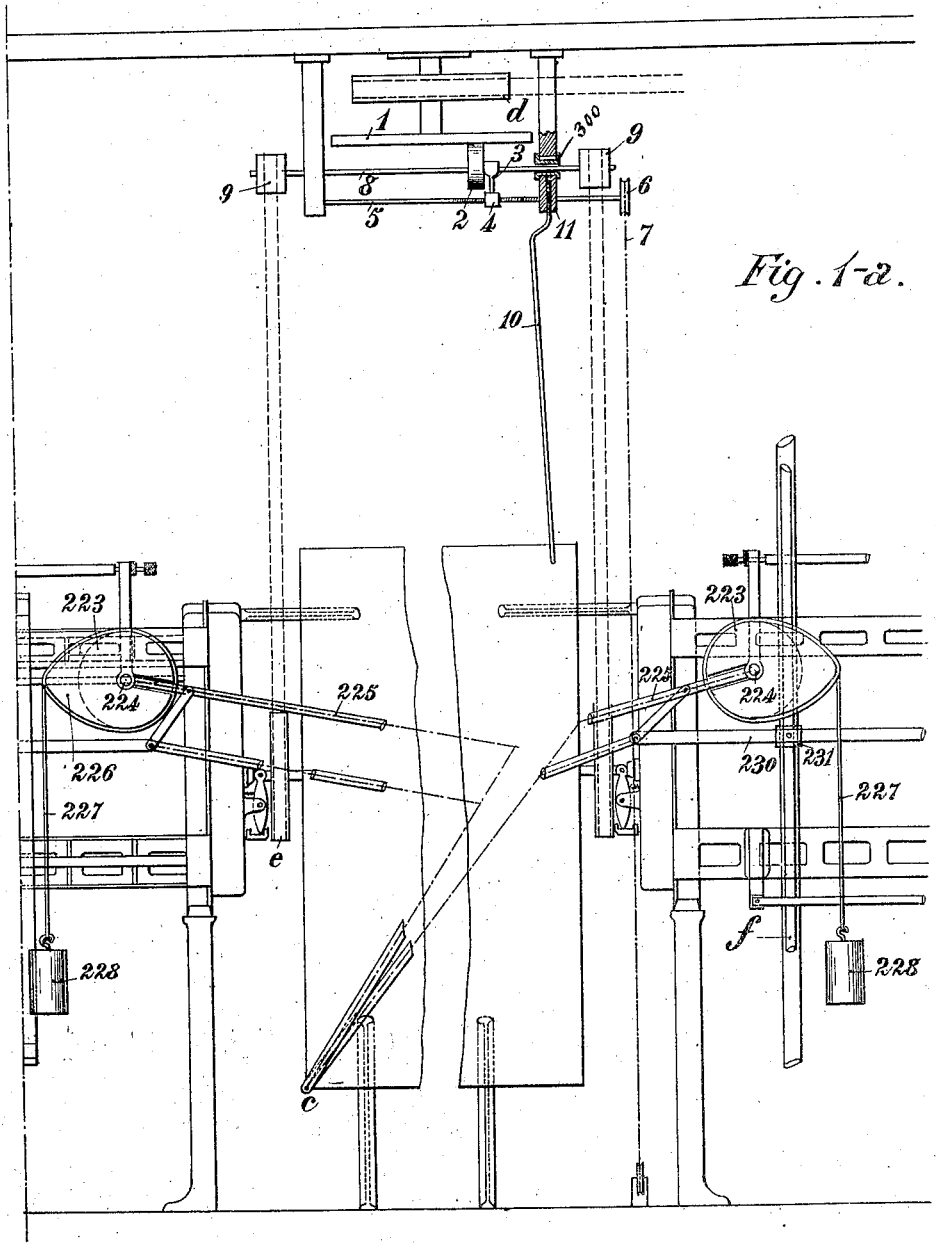
Fig. 1-a.

M. H. RUMPF.
EMBROIDERING MACHINE.
APPLICATION FILED JUNE 23, 1906.
1,020,663.
Patented Mar. 19, 1912.
6 SHEETS—SHEET 3.
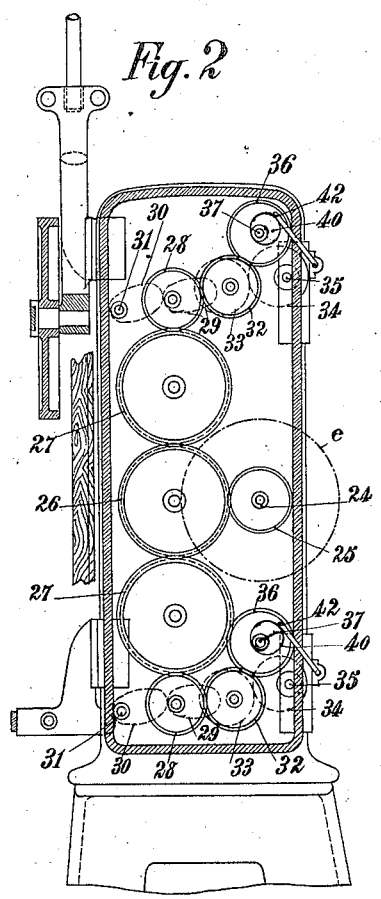
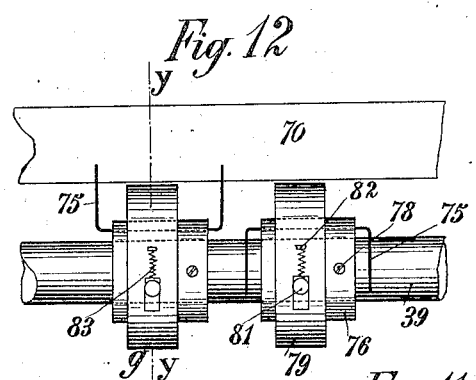
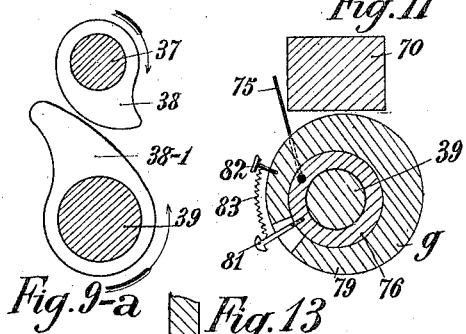
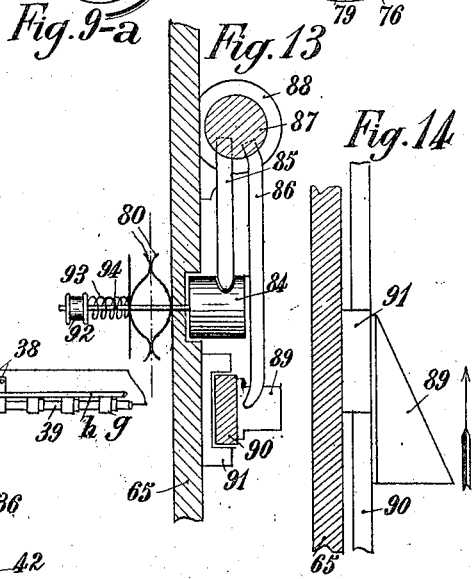
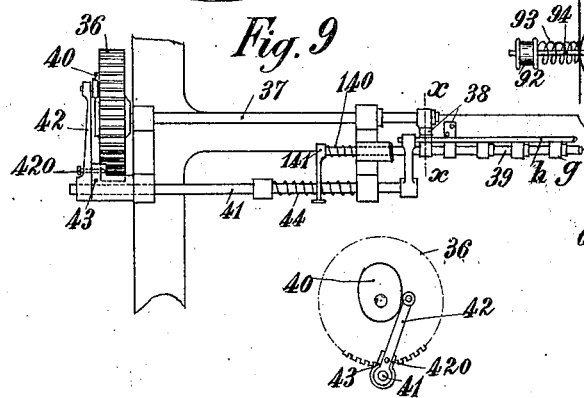
Martin H. Rumpf
Inventor
Witnesses:
Edward C. Rowland
May A. Butler
By his Attorney H. S. MacKaye M. H. RUMPF.
EMBROIDERING MACHINE.
APPLICATION FILED JUNE 23, 1906.
1,020,663.
Patented Mar. 19, 1912.
6 SHEETS—SHEET 4.
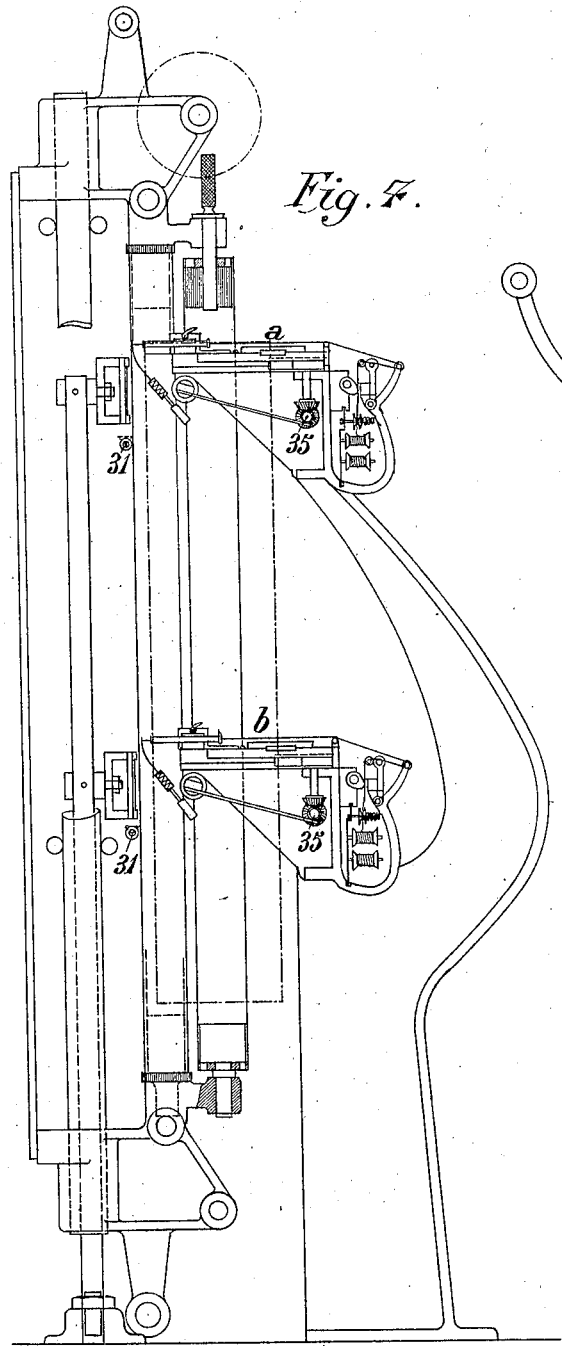
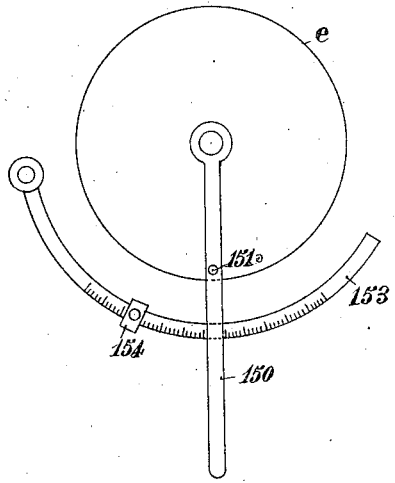
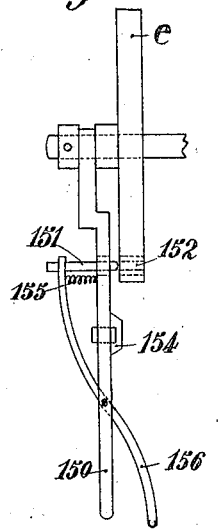
Witnesses:
Edward L. Rowland
May S. Butler
Martin H. Rumpf
Inventor
By his Attorney H. S. Mackaye

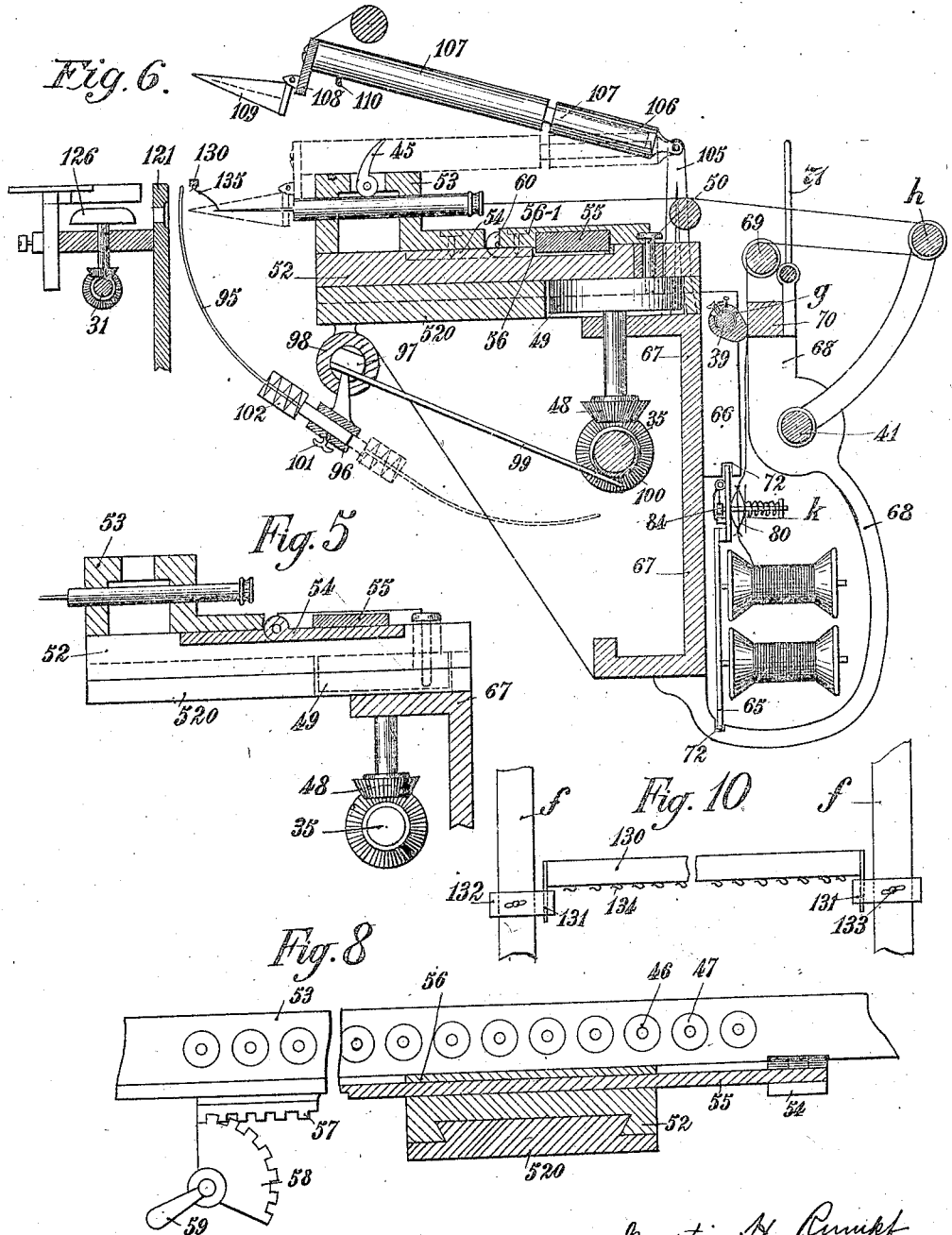

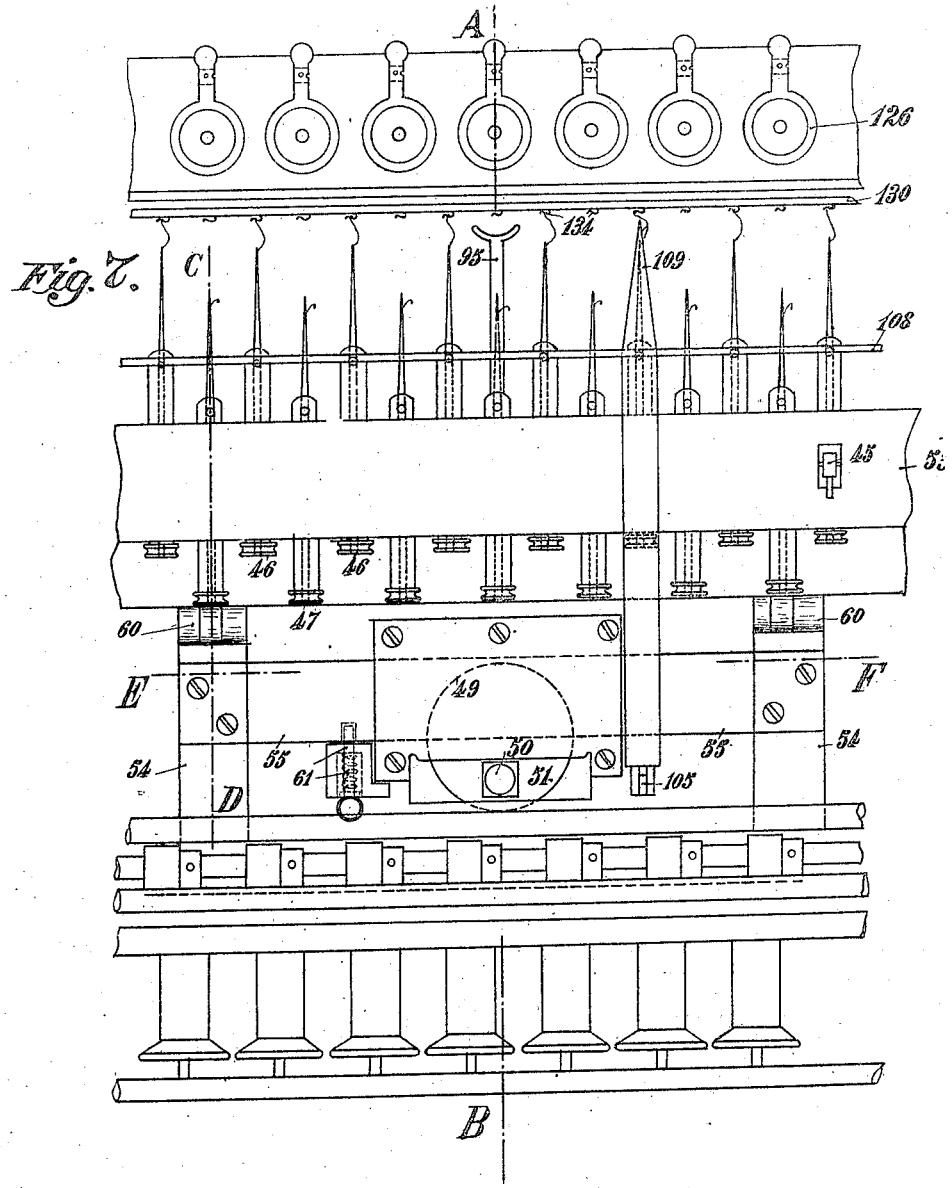

UNITED STATES PATENT OFFICE.

MARTIN HENRI RUMPF, OF PARIS, FRANCE.

EMBROIDERING-MACHINE.

1,020,663.

Specification of Letters Patent.   Patented Mar. 19, 1912.

Application filed June 23, 1906. Serial No. 323,166.

*To all whom it may concern:*

Be it known that I, MARTIN HENRI RUMPF, manufacturer, residing at Paris, France, whose post office address is No. 239 Boulevard Pereire, Paris, France, have invented certain new and useful Improvements in Embroidering-Machines.

This invention relates to improvements in that class of embroidering machines in which the needles are operated mechanically to act on the material held in a movable frame which is operated by means of a pantograph especially applicable in connection with the embroidering machine disclosed in my former U. S. Patent No. 594,653, dated November 30th, 1897.

The object of the present invention is to augment the production of useful work and to reduce the loss of time caused by the preparation by hand which every loom requires.

As the Rumpf machine is known it will suffice to describe the arrangements in relation with the new improvements.

In order that the invention may be fully understood, reference will be made to the accompanying drawings in which:

Figure 1 is a front elevation of a single machine, one end being omitted. Fig. 1ᵃ is a similar view of the contiguous ends of two single machines, indicating the attachments whereby one pantograph is made to control two machines. Fig. 2 is an elevation of the main driving and connecting gearing as seen looking at one side of a single machine. Fig. 3 illustrates on an enlarged scale the driving wheel with the operating device for making open-worked embroidery. Fig. 3ᵃ is a side view of the same. Fig. 4 is a side view of a single machine omitting driving and connecting gears. Fig. 5 is a transverse section on the line C—D of Fig. 7. Fig. 6 is a transverse section of the needle-holder carriage and main adjacent parts, taken on the line A—B of Fig. 7. Fig. 7 is a plan view of the needle-holder carriage and main adjacent elements. Fig. 8 is a front view of the needle-holder carriage-bar, with parts in section on the line E—F of Fig. 7. Fig. 9 is an elevation of the operating device of the thread-feeders and thread-grippers. Fig. 9ᵃ is a section on an enlarged scale, taken on the line $x-x$ of Fig. 9. Fig. 9ᵇ is an elevation of the wheel, cam and lever controlling the thread-feeders. Fig. 10 is an elevation of the bar fitted with clamps for catching the knotted thread ends. Fig. 11 is a sectional view on the line $y-y$ in Fig. 12. Fig. 12 is a plan view of the thread-gripping means. Fig. 13 is a vertical section of the device for controlling thread tension. Fig. 14 is a plan view of the tension bar.

Referring more particularly to Figs. 1 and 4, it will be seen that the machine is provided with two sets of needles $a$ and $b$. The one machine is coupled with the other and the pantographs of both machines are connected with each other in such a manner that a single tracing point $c$ drives the two pantographs, so that a single operator can embroider the fabric on both machines.

In order that the operator may be enabled, from his place to modify at will the speed of the embroidering machine to bring it immediately to rest and to start it again, a friction-gear (see Fig. 1ᵃ) is interposed between the belt-pulley $d$ and the fly-wheels $e$ of the machine. The disk 1, which is directly connected with the belt-pulley $d$, receives from the same a rotary movement and transmits the latter to the roller 2, slidable along the shaft 8, by means of a forked arm 3. The internally tapped boss 4, at the other end of the forked arm 3, engages the screw-threaded portion of the shaft 5, which latter is provided with a rope-pulley 6. This arrangement enables the embroiderer, through the medium of the endless rope 7 passing around the rope-pulley 6, to move the roller 2 toward or away from the center of the disk 1, so as to impart to the machine a slower or faster motion. At the ends of the shaft 8 are mounted the belt pulleys 9, which by means of belts, drive fly-wheels of the machines.

The bent rod 10 (within reach of the embroiderer) is provided with a screw-thread, which screws into the bearing 11 of the shaft 8 and abuts against the under side of a movable bearing 300, which latter has a slight up and down play and which supports the right end extremity of the shaft 8. When the threaded end of the rod 10 is screwed upward by rotation of the rod, the bearing 300 lifts one end of the shaft 8 and brings the friction wheel 2 against the under face of the driving disk 1, whereby motion is imparted to the shaft 8 and the pulleys 9, which latter drive the belts which impel the embroidering machines.

The driving mechanism is illustrated in

Fig. 2. The fly-wheel e is keyed on the shaft 24 together with a toothed wheel 25 which meshes with a toothed wheel 26, the latter, through the medium of the intermediate wheels 27, driving the wheels 28. On the shaft of the wheels 28 are mounted the elliptical toothed wheels 29 meshing with the elliptical toothed wheels 30 and actuating the shafts 31 which set in motion, by means of gear wheels, the lock stitch hooks of the shuttle. On the other side the wheels 28 mesh with the wheels 32, on the shafts of which the elliptical wheels 33 are mounted and gear with the elliptical wheels 34, which impart a to-and-fro motion to the carriage 52 slidable upon its guideway 520 (Figs. 5, 6 and 8) through the medium of the shafts 35, driving wheels 48 and disk 49, the eccentrical wrist-pin 50 of which latter engages a longitudinal slot in the carriage 52.

The thread-grippers g (Fig. 6) which serve to hold the threads when the thread-feeder moves back in order to take up again the excess of thread fed during the process, must open themselves when the thread-feeder approaches its initial point for unwinding from the bobbin the thread used for the stitch. For this purpose the following device, different from the previous one, is provided. As shown in Figs. 9, 9ª and 9ᵇ the wheel 36 driven by the wheel 32 (Fig. 2) rotates the shaft 37. At the end of said shaft is provided a finger 38. A corresponding finger 38¹ is mounted just opposite the former on the shaft 39 which bears the thread-gripper g. The shaft 39, in its normal position, that is to say in the position where the thread is gripped against the bar 70 (Fig. 6) is held by a spring 140 (Fig. 9). When the finger 38 on the shaft 37, owing to its rotary movement, forces backward the finger 38¹ on the shaft 39, the thread-grippers mounted on the latter turn and thus move away from the bar 70 and the threads are released during the time when the two fingers contact together. The lever 141 serves for operating the thread-grippers by hand. (See Fig. 9).

In order that the thread, when it is required to embroider with the same at different places, be not stretched so that the frame may be moved without a tension of the thread and without the bobbins having to deliver some thread, the following different arrangements are provided for the thread-feeder. (Figs. 9, 9ª and 9ᵇ). On the surface of the toothed wheels 36 are fitted cams or eccentrics 40 (Figs. 2 and 9) which give to the shafts 41 of thread-feeder h a swinging motion by means of the arm 42 which bears a roller running over the eccentric. The arm 42, mounted loosely on the shaft 41, is connected with it when the stud 420, engaged in the hole of the part 43 on the shaft 41, is pushed and thus imparts to it the swinging motion. In order that the thread may be kept slack when the frame is moved by a large amount to further embroider at a distant place of the fabric, (because a stretched thread would be injured by the friction in the eye of the needle) the stud 420 has only to be drawn out from the hole 43 and the thread-feeder will be moved forward by the spring 44 so that, when the frame is set in motion, a slack thread is provided. It is to be understood that one end of the spiral spring 44 is attached to the shaft 41 and the other end to its support. When the frame has been shifted by means of the pantograph in such a manner that the needle may perform its work at the place to be freshly embroidered, the thread-feeder is drawn backward in order to enable the stud 420 to be inserted again into the hole; the thread-feeder is now in the suitable position for embroidering.

The hereinbefore described driving mechanism actuates the two sets of needles; when it is desired to work with one set only, it is merely necessary to disengage one of the intermediate wheels 27 (Fig. 2).

The embroidering elements are arranged so that the needle is only engaged in the guiding stitch plate 121 for one third of a stroke so that the material can be moved about during two thirds of a stroke which allows of long stitches and enables a skilled operator to produce 130 stitches per minute.

The somewhat intricate disposition known for colored embroideries designed to bring the needles provided with differently colored threads successively in the proper positions by mechanical devices for the purpose of saving time, have not given the desired results and have all the great disadvantage that they limit too much the number of colors on an embroidery. The hand-adjustment of the needle-holders 46, 47 (Figs. 6 and 7) in the bar 53 enables, in connection with the devices hereinafter described, any desired number of needles, each of which is provided with a different thread, to be employed successively for the same lock stitch hook 126 without any loss of time. The bar 53, in which the needle holders 46, 47 (Figs. 6, 7, 8) are slidably supported and held in the suitable position by screws or eccentric levers 45, is connected to and stayed upon the carriage 52, by the two arms 54 fixed on the plate 55 which may be shifted along in the groove 56 of the carriage 52 in which it is held by the cover 56¹. This improved arrangement enables the carriage 52, as well as simultaneously the needle-holder bar 53, to be moved forward and backward and also the latter to be shifted longitudinally. The length of the plate 55 and the distance between the arms 54 (Fig. 7) control the oblong shifting of the needle-holder bar 53, and consequently the number of needles with which it is possible to work successively, while employing the same lock stitch hook; for instance if the bar 53 may be shifted about 200 mm. and the needles be spaced 15 mm. from each other, 14 needles provided with different threads may be successively employed for the same pattern to be embroidered. At one end of the machine the bar of the needle-holder 53 (Fig. 8) is provided with a toothed rack 57 with which the segment 58 meshes and, by means of the hand-lever 59 actuates or, through the medium of any other suitable device, shifts along the bar 53. When the latter has reached the predetermined position, a bolt 61 (Fig. 7) fitted on to the carriage and actuated by a spring engages a hole in the plate 55 and holds fast the needle-holder bar 53. The hinges 60 of the arms 54 enable the needle-holder 53 to be lifted for the purpose of rendering easier the shifting of the fabric in the frame. In order to have as many needles as possible ready for use, there may be inserted between each pair of needle-holders 46, which each correspond to one lock stitch hook, one or more further needle-holders 47, if the distance between the hooks allows of it. The hand adjustment of the needles for the purpose of further embroidering with another color, as compared with a mechanical adjustment, causes no loss of time, as the latter also requires a hand-arrangement of the thread of every needle with which it is desired to embroider successively, therefore simultaneously the needle-holders may be adjusted by hand. In fact in order to be able to embroider, it is necessary to hold fast the thread depending from the needle-eye in order to make the first narrow stitches which fix the needle-thread by means of the bobbin thread on the fabric. For this purpose, the thread was heretofore fixed as near as possible to the fabric, usually close to the presser-foot. When the first stitches have been made which hold the upper thread on the fabric, it is necessary, in order to be able to embroider further, to cut off the thread which is now fixed to the fabric and also to some point on the frame in order that the fabric may not be damaged by the traction of the thread when the frame is shifted for continuing the embroidery. Consequently a second arrangement by hand is required for the thread of each needle. If it is desired to further embroider with another color, it is necessary to cut off at first the thread of the previously used needle and afterward to effect with the thread of the next needle the manual arrangements hereinbefore referred to. There are these three arrangements by hand to be made which are repeated for each needle with which it is desired to embroider successively; the mechanical devices known for the purpose of removing the needles require this equally. The devices described hereinafter have for their object to lessen as much as possible the loss of time caused by these hand arrangements.

Somewhat above the needle-plate is mounted movably between the vertical rollers of the frame a bar 130 (Figs. 1, 6, 7 and 10). This bar 130 has, on the underside of its two ends, pins 131 (Fig. 10) which may be inserted into holes in the rings 132 which can slide along the roller and may be held fast on the latter in the desired position by means of screws 133. The bar is provided, for each needle, with a clamp 134 in which may be fixed the thread depending from the eye of the needle. In order to enable the thread to be rapidly fixed in the clamp and also to be made loose again, a knot 135 is made at the end of said thread, which immediately fixes the thread into the clamp. The thread, being fixed in this manner on the bar 130 which follows the movement of the frame, enables the embroidering process to be carried on by each needle without having to sever the preliminary attachment, as formerly practiced. All the threads of the needles destined to work successively are provided with these knots which furthermore offer this advantage that the threads which are not actually yet working, cannot slip out of the eye of the needle owing to the movement of the carriage, whereby a further threading would become necessary. The needles, having been once threaded and the threads provided with the knots, are always ready for use.

In order that, when shifting longitudinally the needle-holder bar 53 and the bobbin holder plates 65, the threads may not be held back by the parts supporting the elements which actuate the threads, said supports are placed as shown in Fig. 6. The support 66 affixed to the cross bar 67 of the machine bears the shaft 39 on which the grippers $g$ are attached, and the support 68 carries the bar 70 against which the thread-grippers $g$ press the thread, and said support 68 also carries the thread-feeder $h$, the thread-guider 71 and the roller 69 around which the threads pass. In this manner the threads of the bobbins can follow freely the longitudinal movement of the needles.

The notches 72 provided in the supports 66 and 68 accommodate the plate 65; the latter bears the bobbins and the device K for giving the tension to the thread (Fig. 6). In the form shown the plate 65 is intended to be moved by hand in the grooves 72 to correspond to motion of the bar 53. It is within the scope of my invention to carry this out either by hand or automatically.

In order that, when shifting the needle-holder bar and bobbin-holder 65, for embroidering with another needle, only the threads of the latter may be acted upon by the thread-gripper g and not the threads of the other needles, the thread-grippers are provided with arms 75 (Figs. 11 and 12) which when laid against the bar 70, fulfil this requirement. By means of these arms it is thus possible to render the operation of the thread-gripper, which is used for embroidering, independent from that of the two adjacent thread-grippers. The threads of all needles which must embroider successively by using the same lock stitch hook, are placed between the arms of the corresponding thread-grippers so that the thread with which the embroidering is begun is under the influence of its gripper, and the other close to it. When it is desired to embroider with the thread of the next needle, the thread of the first needle is retired from the thread-gripper owing to the displacement of the needle holder bar and bobbin holder plate, and is automatically replaced by the thread of the second needle with which the embroidering is to be done, and so on successively for all the threads of the needles which have to work with the same lock stitch hook.

In order to give to the thread-gripper a certain elasticity (Figs. 11 and 12), said gripper consists of a hub 76 fixed on the shaft 39 by a screw 78; on the periphery of said hub, is mounted, so as to rotate freely, an eccentric 79. In the thin side of the eccentric is bored an elongated hole in which is housed the screw 81 of the hub 76. Another screw 82 is located in the eccentric in front of the elongated hole and the heads of these two screws are connected by a coil spring 83. Owing to this arrangement the eccentric 79 has a certain resiliency, so that it can answer the purpose in view for threads of various thicknesses. The hub 76 bears the two arms 75 for the purpose already referred to. It will be evident that these arms may also be fitted to the bar 70.

For the tension of the bobbin threads, a device is provided which enables all the threads of the needles with which said threads work to be adjusted simultaneously and, moreover also, each thread individually; this latter arrangement has for its object to equalize any irregularity in the tension of the threads of the lower bobbins by giving to the corresponding threads more or less tension in accordance with the thread of the lower bobbins, in order that the tension of the threads on the fabric may be equal for all the needles. This result is obtained by means of the arrangement provided for each thread (Figs. 6, 13, 14). The thread of the bobbins, which lies between two disks 80 on the rod 94, is held between the said disks by a coil spring 93 through the medium of a nut 92. For adjusting simultaneously the tension of all the upper threads the rod 94, behind the plate 65 which serves as a support for the latter, is provided with a head 84. The head 84 is operated by means of an arm 85, fixed to the shaft 87, which turns freely in a bearing 88. The lower end of this arm enters a cavity in the top of the head 84, as shown. Rotary movement of the shaft 87 is accomplished by means of an arm 86, fixed at one end to said shaft. The lower end of this arm 86 rests upon an inclined plane 89 fixed to the rod 90 which can be reciprocated along the plate 65 in the support 91. When, consequently, the rod 90 is moved along in the direction of the arrow, the arm 86 is lifted up and the shaft 87 rotated so that the head 84 is drawn backward, in consequence of which the coil spring 93 exerts a stronger pressure upon the threads between the disks 80. When on the contrary the rod 90 is moved in a reverse direction to that of the arrow, the natural result is that the pressure on the threads is lessened. As the rod 90 has an incline 89 for each thread, a uniform tension of all the threads is obtained and, owing to that the nut 92 may be screwed against the spring 93, the tension of each individual thread may be adjusted separately.

The presser feet 95 (Figs. 6 and 7) are mounted on the bar 96 movable in connection with the bar 97 in the support 98. On the bar 97 are fixed arms 99 which, under the action of the eccentric 100 mounted on the shaft 35, transmit to the presser feet a swinging movement. The presser feet 95 are mounted adjustably in the quadrangular hole of the bar 96 and fixed in the latter by a set screw 101. The springs 102 of the presser feet give to them a certain amount of elasticity.

When it is not desired to work with all the needles, the presser-feet of some are useless and inconvenient if several pieces of fabric are stretched in the frame; in order to avoid this, these feet are placed in the bar 96 in the reverse position shown in dotted lines on Fig. 6. This is accomplished by loosening the screw 101 and removing the presser-foot from the socket 96; after which it is turned around and replaced in said socket in reversed position, being again secured by tightening the screw 101.

For the open worked embroidery, the following device is provided (Figs. 6 and 7). On the cross bar 67 of the machine are placed at intervals, the uprights 105 and to the latter are pivotally connected the tubes 106 in which slide the rods 107 serving as holders for the bar 108 onto which, for each needle, borers 109 are attached by means of hinges, so that the borers which must not be employed may be brought into a vertical position. Beneath the rod 107 a pin 110 is fitted in such a manner that, when the rod is inclined and assumes the position shown in dotted lines, the pin 110 of the bar engages a hole in the needle holder-bar 53 and thus the bar 108 rests upon the needle holder-bar. The boring device is then connected with the needle holder bar and follows its forward and backward movements. As the borers 109 thus take the place of the needles, these borers are provided on their underside with a recess in which the needles are housed so that the points of said needles and borers are in rectilinear alinement.

In order to raise and lower the bar which bears the borers, a string is employed which is attached to the bar 108 and is passed around rollers in the reach of the embroiderer (see Fig. 6). For making the openings in the fabric, the embroiderer stops the machine in the manner hereinbefore described when the carriage has reached the rear dead point; he releases the string which held the borer-holding bar raised; the latter sinks and takes up the position indicated, and the borers can follow the movements of the carriage.

In order to form the holes when the borers occupy the position indicated in dotted lines in Fig. 6 the needle-carrying bar 53 must be moved back and forth three or four times. The distance to which the borers are forced through the work will determine the size of hole produced. Consequently this operation is not accomplished by means of the belt shown in Fig. 1ª, but the main driving pulley $e$ is moved by hand. In order to facilitate manual operation the construction shown in Figs. 3 and 3ª is employed. Here the lever 150, which is mounted loosely upon the end of the shaft of the pulley $e$, is provided with a movable pin 151 adapted to enter the opening 152 in the pulley $e$. It is evident that by this means the pulley $e$ may be turned back and forth sufficiently to move the borers as above described. In order to properly measure the movement of the borer when thus accomplished the lever 150 plays in front of a graduated arc 153 fixed to the frame of the machine, and provided with an adjustable stop device 154, which limits movement of the lever 150. The pin 151, whereby temporary engagement is secured between the pulley $e$ and the lever 150 is normally forced outward by the spring 155 abutting on the hand lever 156 which is pivoted to the lever 150 and attached to the pin 151. It is obvious that when the rear end of the lever 156 is pushed toward the lever 150, the spring 155 is compressed and the pulley $e$ is engaged by the pin 151.

The hereinbefore described device, in which pins on the rods carrying the borers engage in hole $s$ in the needle holder-bar, enables a rapid operation and requires no displacement either of the frame or of the pattern-board.

In order to secure in all circumstances the true parallel guiding and the equilibrium of the frame $f$ $f^1$ (Fig. 1) in which the fabric is attached, to reduce the friction upon its supports and to avoid its swinging movements, the following device is provided. In order to secure at all times a parallel guidance of the great frame, independently of peculiarities in the pantograph construction, devices are provided which will be best understood with reference to Fig. 1. The pulleys 14 14¹ revolve freely on their axles in the supports placed above the frame connected by a flexible band 15 which force them to revolve together always exactly evenly. In the grooves of the pulleys 14 14¹ metallic cords 16, 16¹ are so disposed that they follow the direction of movement of the pulleys with exactly equal strokes the cords 16, 16¹ which have exactly the same length are attached to the supports 12, 12¹ in which the grooved rollers 21 21¹ can turn freely on their axes. On these grooved rollers rest quite horizontally the rounded bars 20 to the ends of which and exactly parallel to it, the frame is fastened at its two sides, so that its more or less strong loading at one side or the other can have no influence upon the parallelism. The supports 12, 12¹ are held at their proper distance by the rod 210. In order to avoid any oscillatory movement of the frame, a tube 22 is fastened vertically behind the frame to the support of the pulley 14 and the cross-bar 23 of the machine; this tube slides in the hole of an arm fitted to the support of the roller 21. The proper parallel support given in the above described manner to the frames secures an exactly parallel movement and the tube 22, while preventing the swinging movements of the frame, does not affect its horizontal and vertical shifting.

For the purpose of insuring the equilibrium of the frame and reducing as much as possible the load on the grooved roller 21, 21¹ the flexible cord 17, which bears the adjustable weight 13 for balancing the frame and the fabric stretched therein, is fastened to the grooved pulley 19 connected with the pulley 14 so as to follow exactly the direction of movement of the latter; the cord 17 is passed over the pulley 18 of the same diameter as the pulley 19 in order that the weight may be placed externally to the machine. In this manner the frame is balanced in all its positions; as it rises and sinks while remaining always horizontal and parallel and as the counterweight is supported by the fixed axes of the pulleys above the frame, the grooved rollers 21, 21¹ are loaded only by the weight of the frame and not simultaneously by the counterweight as is the case in the device according to the U. S. Patent #594653 and as the pulleys 18 and 19 have a diameter equal to twice that of the pulleys 14, 14¹ which support the frame, the counterweight is reduced by one-half.

In order to balance the varying weighting effect due to the pantograph in its different positions, the pulley 223, which swings freely on its shaft 224 fastened to the machine and bears the long arm 225 of the pantograph fixed at the center of the pulley, is provided with a projecting cam 226 above which is passed the cord 227 fastened to the upper part of the pulley 223 and bearing the counterweight 228. The said cam is so shaped that the more or less great weighting effect which the pantograph exerts according to its position, is balanced by the more or less great distance between the cord and the center of the pulley.

In order to operate the frame by the pantograph the shorter side of the pantograph is connected by a bar 230 with the frame $f$ attached by means of a sliding socket 231 fixed by means of a thumb screw.

What I claim is—

1. In an embroidering machine, a pantograph, needles, needle-holders, a needle-holder bar mounted to be moved toward and from the work and laterally relatively thereto, a bobbin-holding plate mounted on the machine parallel to said bar and movable in a parallel direction to the lateral movement of the bar, bobbin-holders mounted thereon, a work-supporting frame, means independent of the stitch forming elements of the machine for supporting said frame, means connected to said frame for counterbalancing the varying weighting effect of the pantograph in its different positions and operating means for the needles, needle-bar and bobbin-holding plate, substantially as described.

2. In an embroidering machine, needles, needle-holders, a needle-holder bar mounted to be moved toward and from the work and laterally relative thereto, a reciprocating carriage having a slot, a plate passing through said slot and attached to said needle-holder bar, means for giving said carriage movement toward and from the work, and means for imparting lateral movement to said plate, substantially as described.

3. In an embroidering machine, needles, needle-holders, a reciprocating carriage mounted to be moved toward and from the work and having a slot, a sliding plate carried by said slot, a needle-holder bar carried by said plate, a revoluble disk carrying an eccentrically mounted wrist pin engaging a slot in said carriage, means for revolving said disk, and means for imparting lateral movement to said plate, substantially as described.

4. An embroidering machine comprising needles, bobbin-holders and needle holders; in combination with a needle holder bar mounted for both back and forth and longitudinal movement, a reciprocating carriage having a slot, means for moving said carriage toward and from the work, a sliding plate carried in said slot and attached to said needle holder bar, a rack on said plate and a toothed sector engaging said rack for producing longitudinal movement of said needle carrier bar, substantially as described.

5. An embroidering machine comprising needles, bobbin-holders and needle holders; in combination with a needle holder bar mounted for longitudinal movement, means for moving said bar longitudinally, a bobbin carrier plate mounted parallel to said needle holder bar so as to be movable longitudinally and thread grippers near said bobbin holders provided with arms (75) for separating the various threads from each other, substantially as described.

6. A work-supporting means for embroidering machines comprising in combination a work-carrying frame, a longitudinal bar attached above said frame, two movable grooved pulleys running under said bar for its support, a rigid connection between said pulleys, means for guiding said pulleys in their vertical movement, and counterbalanced suspending means for said pulleys adapted to allow vertical movement thereof, substantially as described.

7. In an embroidering machine provided with a controlling pantograph, means for counter-acting differences of effect otherwise produced by the weight of the pantograph in different positions, said means comprising an eccentric connected with said pantograph and pivoted to the machine, a cord wrapped on the periphery of said eccentric and a counterweight on said cord, the eccentric being so shaped as to vary the leverage exerted by the counterweight in correspondence with the variations in the rotative effect exerted by the weight of the pantograph in its corresponding movements, substantially as described.

8. In a work-supporting means for embroidering machines, a work-carrying frame, comprising a horizontal bar, grooved pulleys supporting said bar and having a rigid connection between them, counterweighted suspension means attached to said pulleys, and a vertical guide bar (22) engaging the immediate support of one of said pulleys, substantially as described.

9. An embroidering machine comprising a row of needles mounted for reciprocating movement, a corresponding row of bobbin-holders, a work-carrying frame supported in front of said needles, a bar (130) carried on said frame parallel to said needles, a row of clamps carried by said bar and placed opposite said needles, and means for operating said needles, substantially as described.

10. An embroidering machine comprising a row of needles, a reciprocating bar carrying said needles, a row of borers pivoted above said needles and adapted to be lowered into engagement with said bar, said borers being hollowed out underneath so as to fit over said needles, and means for causing said bar and borers to move back and forth together, substantially as described.

MARTIN HENRI RUMPF.

Witnesses:
ROBERT COLLONG,
HANSON C. COXE.